Jan. 10, 1939.  E. T. VINCENT  2,143,290
ENGINE
Filed Dec. 3, 1934
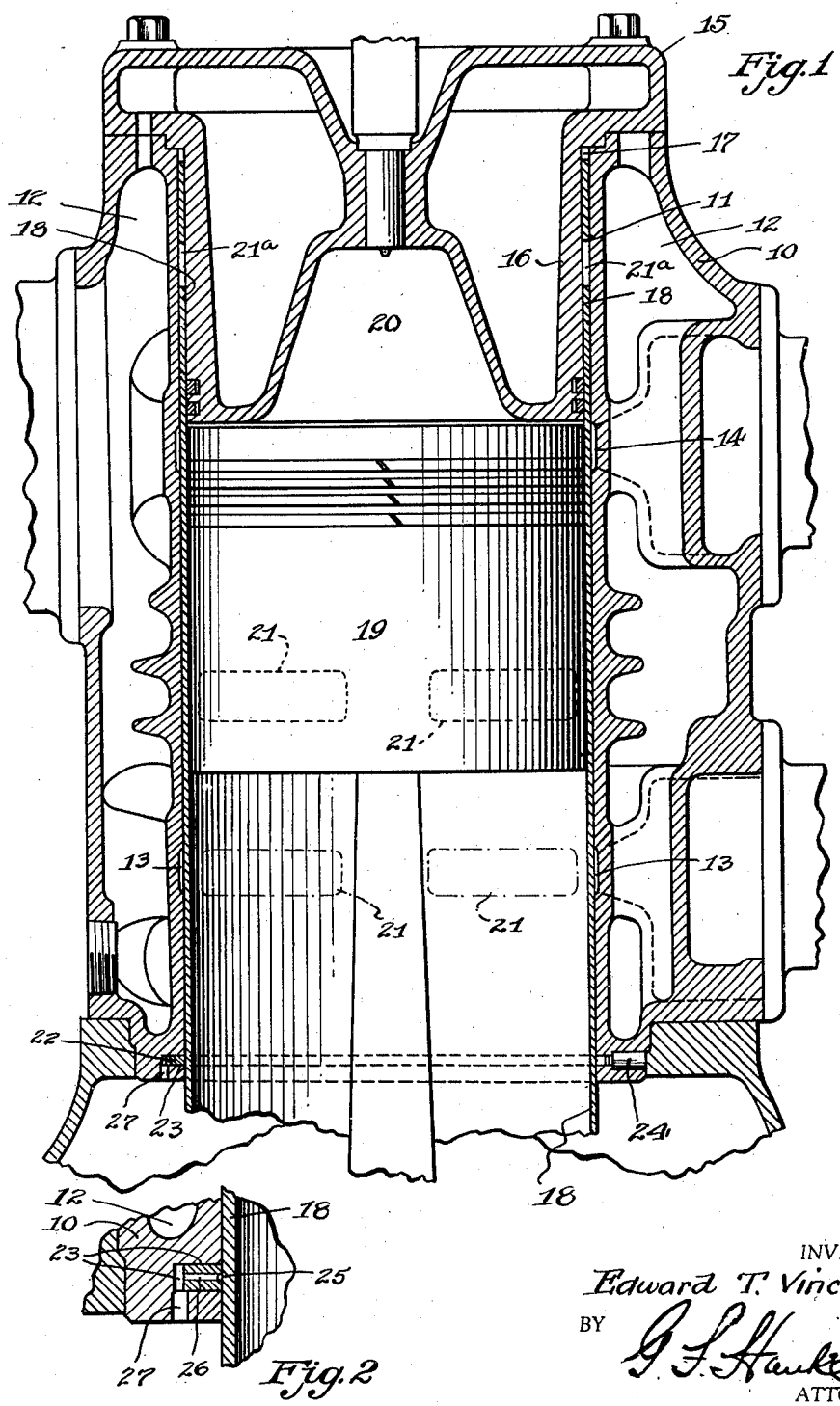
INVENTOR.
Edward T. Vincent
BY
ATTORNEY.

Patented Jan. 10, 1939

2,143,290

UNITED STATES PATENT OFFICE 2,143,290

ENGINE

Edward T. Vincent, Detroit, Mich., assignor to Continental Motors Corporation, Detroit, Mich., a corporation of Virginia Application December 3, 1934, Serial No. 755,673

7 Claims. (Cl. 123—196)

My invention relates to engines and more particularly to a sleeve valve engine and to means preventing the creeping of lubricating oil outwardly of the cylinder from the engine crankcase to the cylinder ports and/or into the engine combustion chamber.

In sleeve valve engines, and particularly with sleeve valve engines of the type employing a single sleeve valve operating with a combined movement, considerable difficulty has been experienced in the past in controlling the escape of lubricating oil from the engine crankcase, this lubricating oil having a tendency to creep outwardly of the cylinder where it is scraped off the sleeve and deposited into the cylinder port while other portions escape directly into the combustion chamber resulting in an excessive oil consumption during engine operation. Some of the lubricating oil escaping into the cylinder intake port is picked up by the incoming charge and carried into the combustion chamber while the remainder collects in the cylinder intake chamber and intake manifold, thereby flooding same. Although the particular problem with which this invention is associated, is particularly connected with an engine of the single sleeve valve type, it will be obvious that the principles of my invention may be incorporated in engines other than those of the single sleeve valve type.

It is an object of my present invention to provide a simple structure for preventing the creeping of an excessive amount of lubricant outwardly of the cylinder wall intermediate the sleeve valve and cylinder, by incorporating means for removing said excess lubricant and returning same to the engine crankcase before it has a chance to escape into the cylinder port or into the combustion chamber.

In the particular embodiment of the invention as shown in the accompanying drawing, I have accomplished this result by providing a contracting spring ring which is supported by the cylinder and engages the sleeve valve for scraping off surplus lubricating oil and returning same to the crankcase by conducting same through a connecting passage between the recess supporting the ring and the engine crankcase. This contracting ring is preferably located between the engine crankcase and the innermost position of travel of the inner sleeve port or ports.

By reason of the present construction, it will be noted that the lubricant consumption of engines of the sleeve valve type has been materially reduced and the general performance of the engine has been materially improved.

For a further detailed understanding of my invention, reference may be had to the accompanying drawing which illustrates one form which my invention may assume, and in which:

Fig. 1 is a vertical sectional view through a typical engine cylinder illustrating the principles of my present invention, and Fig. 2 is an enlarged detail view in cross-section showing the contracting spring ring which engages the sleeve valve for scraping off excess lubricant from said sleeve valve for returning same to the engine crankcase.

The accompanying drawing illustrates a typical cylinder of a sleeve valve engine and comprises in general a cylinder structure 10 having a cylinder 11 and provided with a suitable cooling jacket 12. The engine cylinder is provided with suitable intake and exhaust ports 13 and 14, respectively, and the open outer end of the cylinder is closed by means of a cylinder head structure 15, said cylinder head structure having a portion 16 depending within the cylinder and spaced from the walls thereof to provide a sleeve pocket 17 for accommodating the outer end of the sleeve valve means 18. The sleeve valve means as illustrated in this present application comprises a single sleeve which is moved by means of a suitable driving mechanism (not shown) with a combined reciprocating and oscillating motion relative to the cylinder and sleeve axes. The cylinder head cooperates with the piston 19 to provide a combustion chamber 20 lying substantially adjacent the cylinder outer end. Said sleeve valve means is preferably ported for intake and exhaust as at 21 and 21a to control the engine cyclical events and it will be noted that the sleeve intake ports 21 are herein illustrated for cooperative operation with the cylinder intake ports 13 for controlling the engine intake cycle, said sleeve intake ports operating substantially adjacent the inner end of the engine cylinder, the dot and dash showing of said sleeve intake ports 21 illustrating substantially the innermost position of travel of said intake ports.

Lubricating oil from the engine crankcase is splashed onto the sleeve valve means and in the present instance it has a tendency to creep outwardly of the cylinder between the cylinder and sleeve valve, this lubricating oil escaping into the cylinder ports and/or into the combustion chamber, thereby resulting in an excessive oil consumption. Said lubricating oil either escapes into the intake port and thus into the combustion chamber, directly into the combustion chamber, or out through the cylinder exhaust port or ports.

I have provided means for preventing the tendency of the lubricating oil to creep outwardly of the cylinder, and this means consists in providing a contracting spring ring 22 carried by the cylinder and yieldingly engaging the sleeve valve for scraping excess lubricating oil from the outer cylindrical surface of the sleeve for return to the engine crankcase.

The present construction is carried out by providing an annular recess 23 in the cylinder which opens radially inwardly thereof for supporting the contracting spring ring 22. This ring is preferably split and I preferably provide a pin or dowl 24 carried by the cylinder which is arranged to engage in the split to prevent relative rotation of the ring within the cylinder recess. The ring is preferably provided with an annular inner groove 25, said groove connecting with the radial passages 26 leading to the outer cylindrical surface of the said spring ring. Thus, the lubricating oil which is scraped off the sleeve valve means by the ring is conducted toward the outer surface of the ring through these passages 26 where it is collected in recess 23 and returned to the engine crankcase through the passageway 27, drilled or otherwise formed in the cylinder structure.

It will be noted that this contracting spring ring may be readily sprung into the recess of the cylinder and the same is arranged to yieldingly engage the sleeve valve and thus prevent any excessive amount of lubricating oil from traveling outwardly of the cylinder between the sleeve valve and cylinder wall. The contracting spring ring is supported in such a way as to remain stationary and the sleeve valve is moved with respect to the ring. Thus, it will be noted that there is no wear between the ring and the recess carried by the cylinder and the ring will eventually wear and seat itself against the sleeve valve thereby providing for an efficient oil seal which improves with use.

The contracting spring ring is very readily seated within the cylinder recess and assembled with an engine of this character, and a ring of this type has particular significance in connection with an engine of the single sleeve valve type in that the outer cylindrical surface of the sleeve which moves relative to the cylinder wall tends to promote the creeping of lubricating oil outwardly of the cylinder. By scraping off excess lubricating oil and returning same to the crankcase, it is found that only a minimum amount of said lubricating oil is permitted to travel outwardly of the cylinder into the cylinder ports and/or into the engine combustion chamber. The function of the ring is such as to permit only enough lubricating oil to escape, such as will adequately lubricate the sleeve and provide for efficient engine operation as regards sleeve movement.

Preferably this contracting ring is located intermediate the innermost cylinder port or ports and the engine crankcase, and most generally, it is found preferable to locate the ring in the vicinity of the cylinder inner end and inwardly of the innermost position of travel of the inner sleeve port or ports.

Although I have illustrated but one form of my invention and have described in detail but a single application thereof, it will be apparent to those skilled in the art to which my invention pertains, that various modifications and changes may be made therein without departing from the spirit of my invention or from the scope of the appended claims.

What I claim as my invention is:

1. In a sleeve valve internal combustion engine having a crankcase, a cylinder head and piston associated therewith and cooperating therewith to define a combustion chamber substantially adjacent the cylinder outer end, reciprocating sleeve valve means operable in said cylinder and provided with intake ports, and a contracting spring ring carried by said cylinder for yieldingly engaging the sleeve valve means, said ring supported intermediate the said combustion chamber and said crankcase and inwardly of the innermost position reached by said sleeve intake ports.

2. In a sleeve valve internal combustion engine having a crankcase, a cylinder head and piston associated therewith and cooperating therewith to define a combustion chamber substantially adjacent the cylinder outer end, reciprocating sleeve valve means operable in said cylinder and provided with intake ports, said cylinder having an annular recess opening radially inwardly of the cylinder and located substantially adjacent the cylinder inner end, means connecting the annular recess with the crankcase, and a contracting spring ring supported in said annular recess and yieldingly engaging at all times that portion of said sleeve valve means inwardly of said sleeve intake ports.

3. In a sleeve valve internal combustion engine having a crankcase, a cylinder head and piston associated therewith and cooperating therewith to define a combustion chamber substantially adjacent the cylinder outer end, reciprocating sleeve valve means operable in said cylinder and having intake ports, and a contracting spring ring supported for yielding engagement at all times with the outer cylindrical surface of the sleeve valve means lying inwardly of said sleeve intake ports, said ring engaging that sleeve portion operating in the vicinity of the cylinder inner end.

4. In a sleeve valve internal combustion engine having a crankcase, a cylinder head and piston associated therewith and cooperating therewith to define a combustion chamber substantially adjacent the cylinder outer end, sleeve valve means operable in said cylinder, said sleeve valve means being ported for cooperative operation with the cylinder ports whereby to control the engine cyclical events, and a contracting spring ring supported by said cylinder inner end and yieldingly engaging said sleeve valve means at all times inwardly of the sleeve valve ports.

5. In a sleeve valve internal combustion engine having a cylinder, a piston, and an oscillatory valve sleeve operable between said piston and cylinder and provided with intake ports, a contracting spring ring carried by said cylinder for yieldingly engaging at all times said valve sleeve portion lying inwardly of said intake ports; and means for preventing arcuate movement of said ring under the influence of the oscillatory movements of said sleeve.

6. In a sleeve valve internal combustion engine having a cylinder, a piston, and an oscillatory valve sleeve operable between said piston and cylinder and provided with intake ports, a contracting spring ring carried by said cylinder for yieldingly engaging at all times said valve sleeve portion lying inwardly of said sleeve intake ports; and means carried by the cylinder wall engaging said ring to prevent arcuate movement of the latter under the influence of the oscillatory movements of said sleeve.

7. In a sleeve valve internal combustion engine having a crankcase, a cylinder provided with an annular recess adjacent said crankcase, a piston, and an oscillatory and reciprocatory valve sleeve operable between said piston and cylinder having intake ports, a split contracting spring ring carried by said cylinder in said recess for yieldingly engaging at all times the exterior surface of said valve sleeve portion lying inwardly of said sleeve intake ports; and a pin carried by the cylinder wall engaging the split in said ring to prevent circumferential movement of the latter under the influence of the oscillatory movements of said valve sleeve.

EDWARD T. VINCENT.